(12) United States Patent
Tominaga et al.

(10) Patent No.: US 10,715,016 B2
(45) Date of Patent: Jul. 14, 2020

(54) WINDING DEVICE AND WINDING METHOD

(71) Applicant: NITTOKU ENGINEERING CO., LTD., Saitama-shi, Saitama (JP)

(72) Inventors: Ryuto Tominaga, Fukushima (JP); Koji Kondo, Fukushima (JP)

(73) Assignee: NITTOKU CO., LTD., Saitama, Saitama (JP)

( * ) Notice: Subject to any disclaimer, the term of this patent is extended or adjusted under 35 U.S.C. 154(b) by 145 days.

(21) Appl. No.: 16/089,430

(22) PCT Filed: Sep. 11, 2017

(86) PCT No.: PCT/JP2017/032728
§ 371 (c)(1),
(2) Date: Sep. 28, 2018

(87) PCT Pub. No.: WO2018/070160
PCT Pub. Date: Apr. 19, 2018

(65) Prior Publication Data
US 2019/0115813 A1     Apr. 18, 2019

(30) Foreign Application Priority Data
Oct. 14, 2016   (JP) .................................. 2016-202226

(51) Int. Cl.
| H02K 15/02 | (2006.01) |
| H02K 15/04 | (2006.01) |
| H02K 15/06 | (2006.01) |
| H01F 41/04 | (2006.01) |
| H02K 15/14 | (2006.01) |

(52) U.S. Cl.
CPC ......... *H02K 15/0442* (2013.01); *H01F 41/04* (2013.01); *H02K 15/04* (2013.01); *H02K 15/063* (2013.01); *H02K 15/14* (2013.01)

(58) Field of Classification Search
CPC .. H02K 15/02; H02K 15/0442; H02K 15/063; H02K 15/14; H02K 15/062; H02K 41/04
See application file for complete search history.

(56) References Cited

U.S. PATENT DOCUMENTS

| 4,826,091 | A | * | 5/1989 | Legatos | ................. | E04G 21/12 |
| | | | | | | 242/431 |
| 2002/0047462 | A1 | * | 4/2002 | Mayer | .................... | H02K 15/02 |
| | | | | | | 29/596 |
| 2004/0187294 | A1 | * | 9/2004 | Inaishi | ................... | H02K 3/505 |
| | | | | | | 29/598 |
| 2005/0023401 | A1 | * | 2/2005 | Hsu | ....................... | B21C 47/045 |
| | | | | | | 242/362 |
| 2010/0231084 | A1 | * | 9/2010 | Kinoshita | ............. | H02K 1/148 |
| | | | | | | 310/216.009 |

(Continued)

FOREIGN PATENT DOCUMENTS

| JP | 2000-245120 A | 9/2000 |
| JP | 2003319622 A | 11/2003 |

*Primary Examiner* — Emmanuel M Marcelo
(74) *Attorney, Agent, or Firm* — Rabin & Berdo, P.C.

(57) ABSTRACT

A winding device includes a winding core configured to take up a wire, wherein the winding core includes an inner winding core configured to be rotated by a rotating part and an outer winding core configured to surround the inner winding core and rotate together with the inner winding core.

6 Claims, 15 Drawing Sheets

(56) References Cited

U.S. PATENT DOCUMENTS

| | | | |
|---|---|---|---|
| 2014/0062249 A1* | 3/2014 | Nagao | H02K 3/345 |
| | | | 310/215 |
| 2015/0008779 A1* | 1/2015 | Shi | H02K 21/24 |
| | | | 310/89 |
| 2015/0338243 A1* | 11/2015 | Miyao | H01F 41/10 |
| | | | 324/207.16 |
| 2018/0233996 A1* | 8/2018 | Zhu | H02K 15/02 |
| 2018/0351417 A1* | 12/2018 | Tsuiki | H02K 3/18 |
| 2019/0149022 A1* | 5/2019 | Hino | H02K 15/02 |
| | | | 310/195 |
| 2019/0319504 A1* | 10/2019 | Shiraishi | H02K 15/03 |

* cited by examiner

WINDING DEVICE AND WINDING METHOD

TECHNICAL FIELD

The present invention relates to a winding device and a winding method for fabricating a coil which is inserted into slots of a stator core of a generator, a motor or the like and. The present invention more particularly relates to a winding device and a winding method suitable for fabricating a coil to be lap-wound over a plurality of slots.

BACKGROUND ART

Conventionally, a stator of a generator or motor includes a hollow cylindrical stator core having a plurality of teeth (magnetic poles) radially arranged and projecting radially inward and a plurality of slots open between adjacent ones of the teeth, and a stator coil assembled with the core by accommodating coil side parts into the slots. Concerning the assembling of a stator coil, a so-called inserter method for fabricating the stator coil separately from a stator core in advance and, thereafter, accommodating this coil into each slot of the core is known (see, JP2000-245120A).

A coil used in this inserter method is known to be formed into a track shape by annularly winding a wire and have straight parts on both sides accommodated into slots of a stator core. In the stator coil inserted into the slots, parts that are accommodated in the slots serve as coil side parts and the remaining parts of the coil projecting from end surfaces of the stator core without being inserted into the slots serve as coil end parts.

SUMMARY OF INVENTION

For higher efficiency, miniaturization and the like of generators and motors, it is effective to improve a space factor of a winding wire. For the purpose of improving the space factor of the winding wire, as shown in FIG. 12, coil side parts 13a, 14a of a stator coil 12 forming one winding layer may be respectively inserted into a plurality of slots 11b (two slots 11b in FIG. 12) of a stator core 11.

In the case of respectively accommodating the coil side parts 13a, 14a on both sides in the stator coil 12 into the plurality of slots 11b, this stator coil 12 is composed of an inner coil 13 and an outer coil 14 arranged outward of the inner coil 13. The coil side parts 13a on both sides of the inner coil 13 are accommodated into a pair of slots 11b provided at a predetermined interval from each other, and the coil side parts 14a of the outer coil 14 are accommodated into the slots 11b outwardly adjacent to the slots 11b having the inner coil 13 accommodated therein.

A length L1 between the coil side parts 13a in the inner coil 13 and a length L2 between the coil side parts 14a in the outer coil 14 are different. Thus, if the inner and outer coils 13, 14 are separately fabricated, a coil fabrication time is doubled and a process of electrically connecting the inner and outer coils 13, 14 is also necessary in a post-process. As a result, manufacturing processes increase, thereby causing a problem of pushing up a unit price of the obtained stator.

To prevent an increase of the manufacturing processes, it is thought to use a coil formed of a wire wound into a single shape as the inner and outer coils 13, 14 and accommodate the coil side parts 13a, 14a on the both sides of each of the inner and outer coils 13, 14 into two slots 11b. However, since the length L1 between the coil side parts 13a in the inner coil 13 and the length L2 between the coil side parts 14a in the outer coil 14 are different as shown in FIG. 15, coil end parts 13b of the inner coil 13 project from end surfaces of the core 11 beyond coil end parts 14b of the outer coil 14. Since the coil end parts 13b of the inner coil 13 and the coil end parts 14b of the outer coil 14 radially overlap, it is difficult to form the coil end parts 13b, 14b and the outer shape of the generator or motor is enlarged to cause a problem of deteriorating the efficiency of the generator or motor.

The present invention aims to provide a winding device and a winding method capable of continuously fabricating a plurality of coils in which parts of a wire forming coil end parts are different in length like an inner coil and an outer coil.

The present invention relates to a winding device for taking up a wire on a winding core rotated by a rotating part. According to one aspect of the present invention, the winding core includes an inner winding core configured to be rotated by the rotating part and an outer winding core configured to surround the inner winding core and rotate together with the inner winding core.

According to another aspect of the present invention, a winding method includes an inner winding step of fabricating an inner coil by rotating an inner winding core by a rotating part to wind a wire propelled from a wire propelling member around the inner winding core, a surrounding step of surrounding the inner winding core together with the inner coil by an outer winding core, and an outer winding step of fabricating an outer coil by rotating the outer winding core together with the inner winding core to wind the wire propelled from the wire propelling member around the outer winding core.

DESCRIPTION OF EMBODIMENT

Next, an embodiment of the present invention is described with reference to the drawings.

Figure 1:
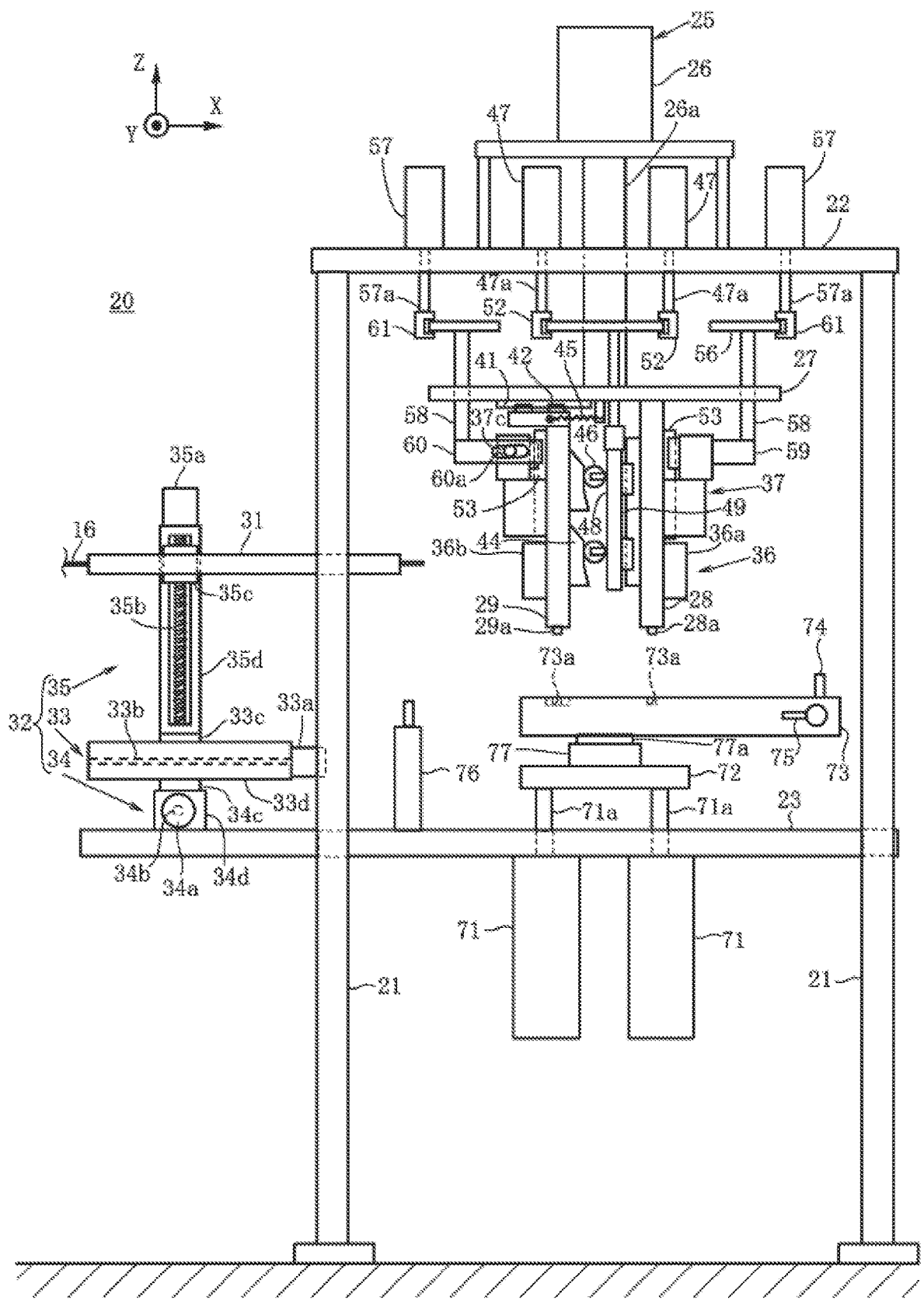
FIG. 1 is a front view of a winding device in an embodiment of the present invention.

FIG. 1 shows a winding device 20 according to the embodiment of the present invention. The winding device 20 is described with three axes of X, Y and Z orthogonal to each other set in each figure. In the following description, it is assumed that the X axis is an axis extending in a horizontal lateral direction, the Y axis is an axis extending in a horizontal front-rear direction and the Z axis is an axis extending in a vertical direction.

Figure 13:
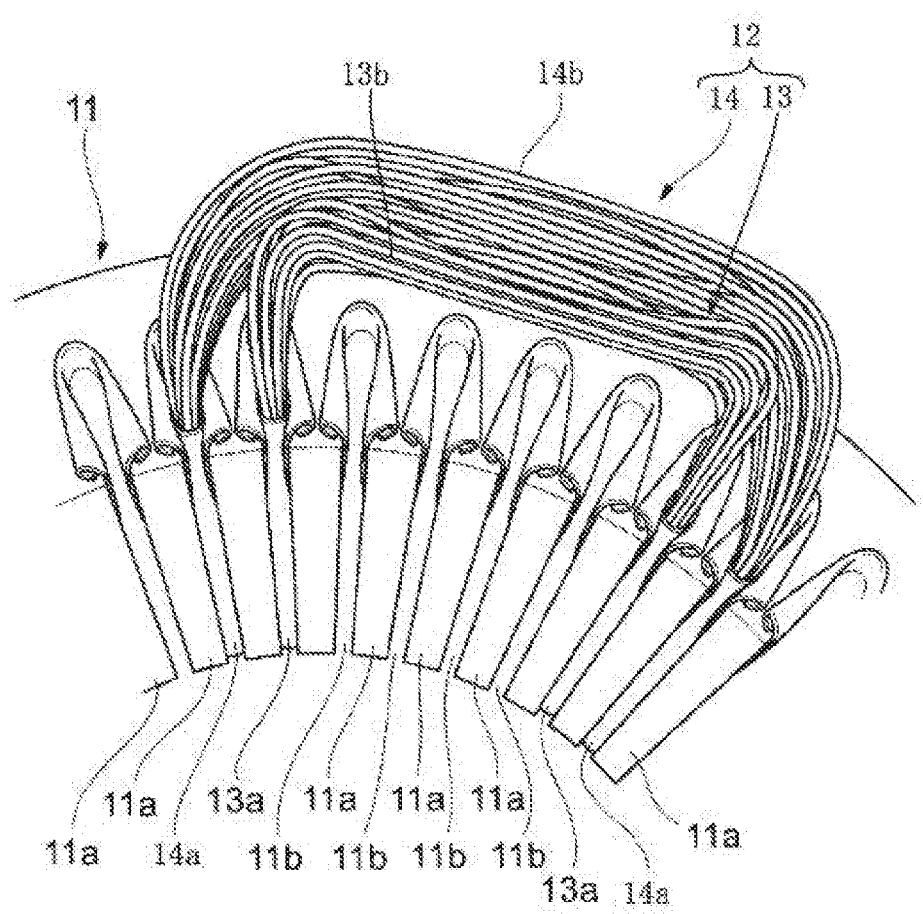
FIG. 13 is an enlarged top view of a stator with slot in which the single stator coil including the inner and outer coils inserted.
Figure 14:
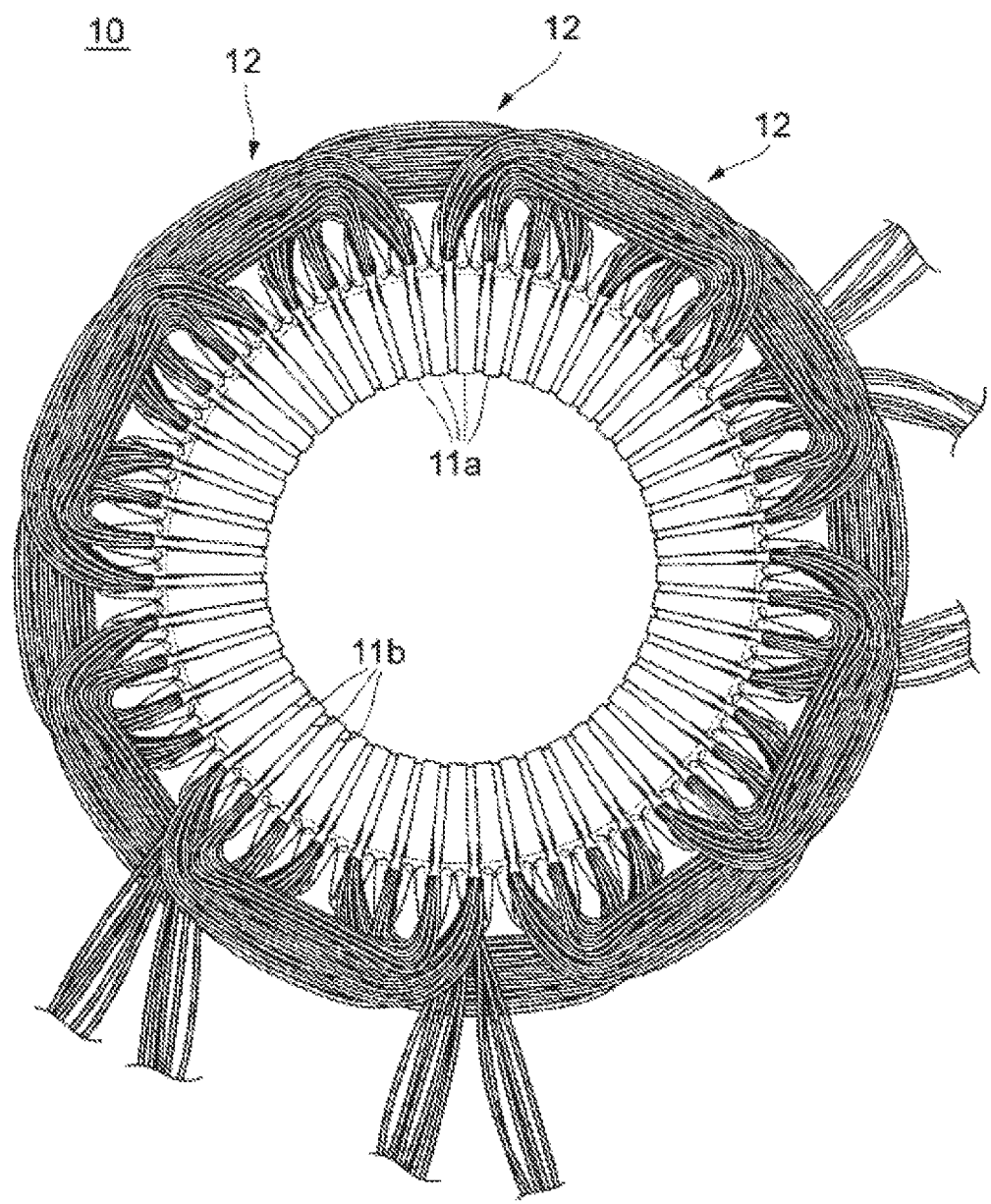
FIG. 14 is a top view of the stator with a stator core on which a plurality of stator coils mounted.
Figure 15:
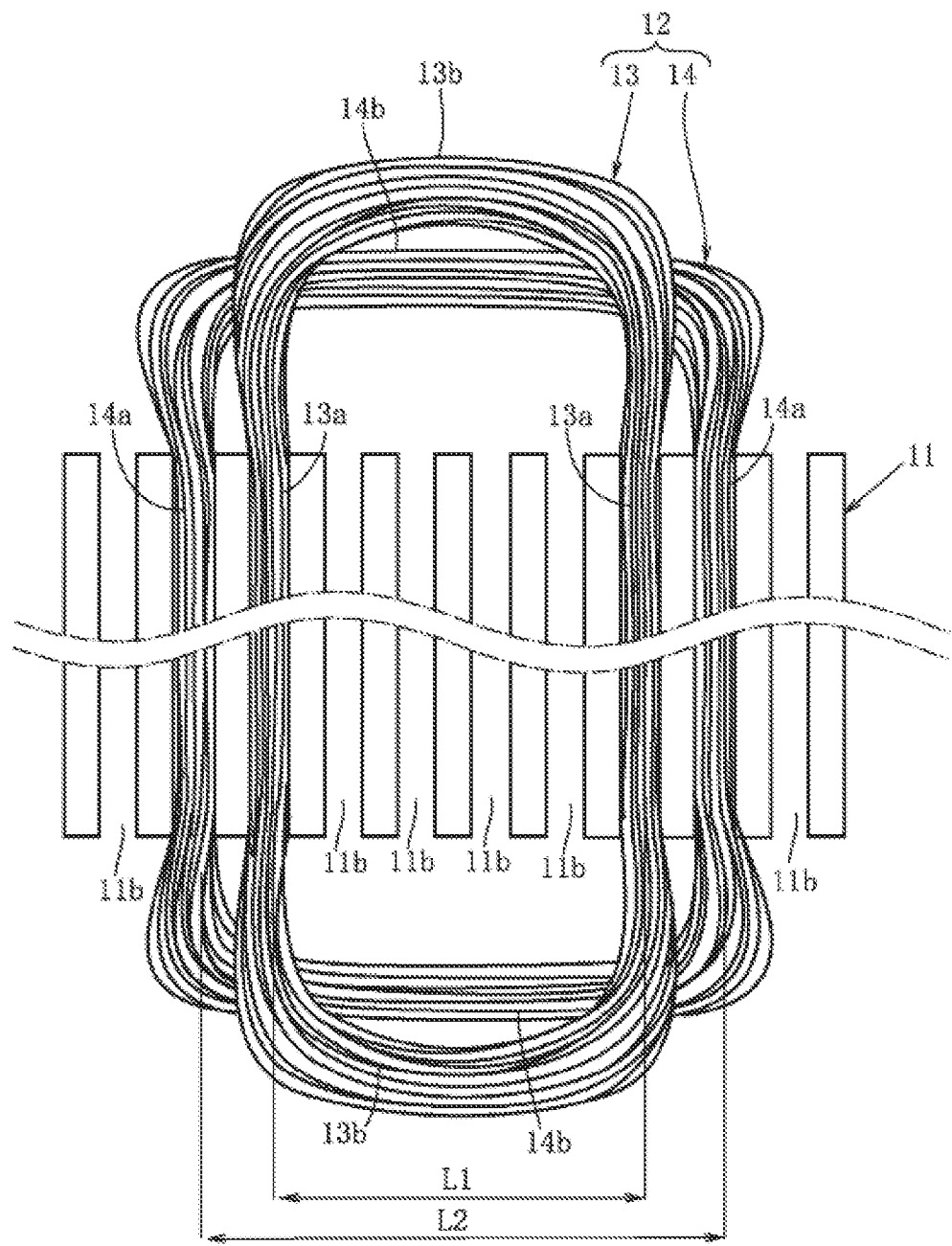
FIG. 15 is a view, corresponding to FIG. 12, showing a state where stator coils having a single size are inserted in a plurality of slots.

As shown in FIGS. 13 and 14, a stator 10 of a generator or motor includes a hollow cylindrical stator core 11, and a stator coil 12 assembled with the stator core 11. The stator core 11 includes a plurality of teeth (magnetic poles) 11a radially arranged and projecting radially inward, and a plurality of slots 11b open between adjacent ones of the teeth 11a.

The winding device 20 in the present embodiment fabricates a stator coil 12 used in the stator 10 (FIG. 14) of a three-phase alternating-current generator. Specifically, the winding device 20 is suitable for fabricating the stator coil 12 effective in the case of respectively inserting coil side parts 13a, 14a of the stator coil 12 into two slots 11b as shown in FIG. 13.

Figure 12:
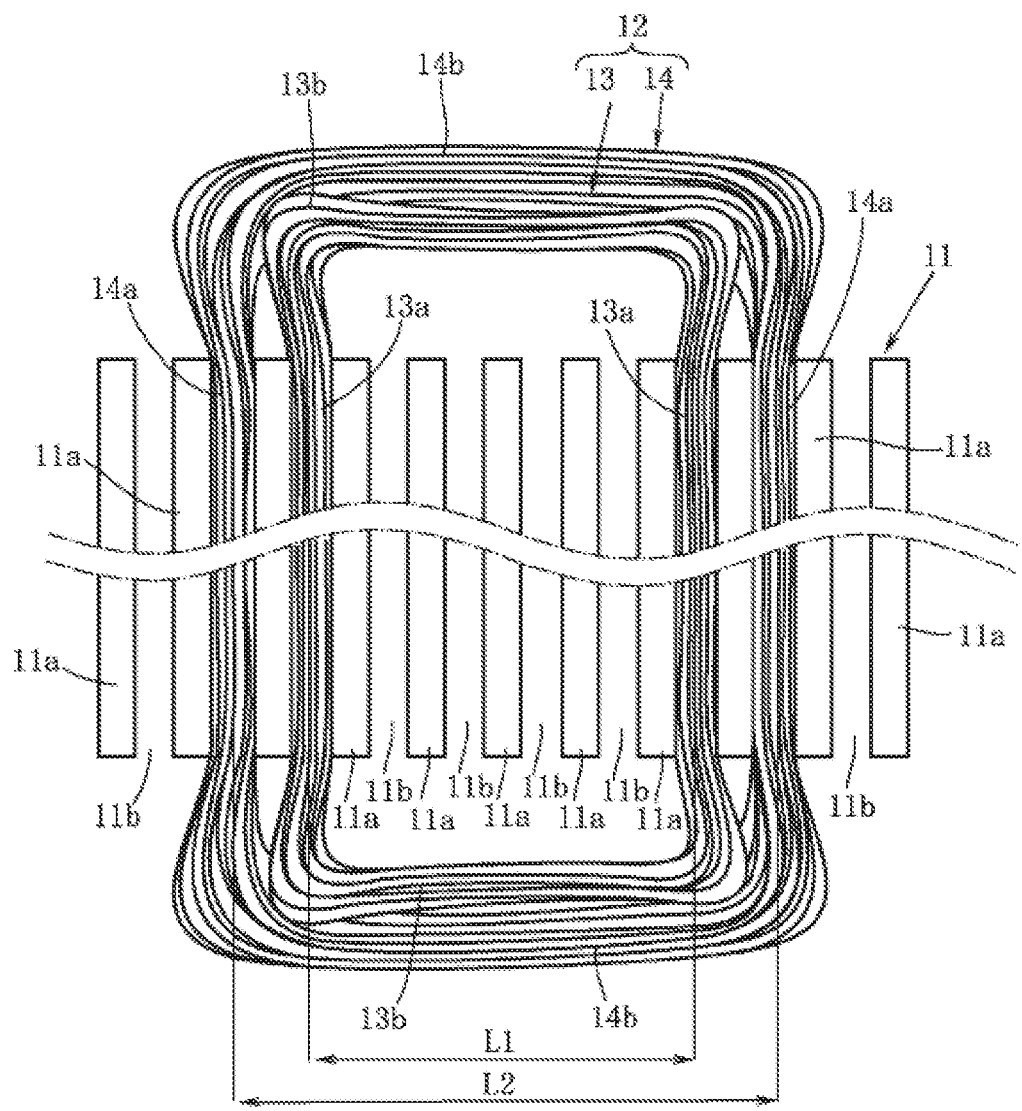
FIG. 12 is a view as seen a core from inside, the core with a plurality of slots into which coil side parts of a stator coil including the inner and outer coils inserted.

The stator coil 12 forms one winding layer and is, on the other hand, composed of two small and large continuous track-shaped coils 13, 14 as shown in FIG. 12. Since the coil side parts 13a, 14a of the coils 13, 14 are respectively inserted into two adjacent slots 11b, an interval L1 between the coil side parts 13a and an interval L2 between the coil side parts 14a are different.

As shown in FIG. 1, the winding device 20 includes a plurality of support posts 21 extending in the vertical direction, an upper table 22 provided substantially horizontally atop the plurality of support posts 21, and a lower table 23 provided substantially horizontally on intermediate parts of the plurality of support posts 21. Further, the winding device 20 includes winding cores 36, 37 for taking up a wire 16 propelled from a wire propelling member 31 by being rotated by a rotating part 25.

The wire 16 in the present embodiment is a coated conductive wire. Further, the wire 16 is a so-called round wire having a circular cross-section. It should be noted that this wire 16 may be a so-called rectangular wire having a rectangular cross-section. Although the wire propelling member 31 in the present embodiment is described to propel the single wire 16, the wire propelling member 31 may propel a plurality of wires 16 in a juxtaposed state.

Although not shown, the wire 16 is wound and stored on a spool. The wire 16 that is pulled out from the spool is straightened by an unillustrated stretcher and, thereafter, guided to the wire propelling member 31. If the wire propelling member 31 is configured to propel a plurality of wires 16, the plurality of wires 16 are wound and stored on separate spools. The wires 16 that are separately pulled from a plurality of spools are respectively straightened by a stretcher and the plurality of thus straightened wires 16 are guided to the wire propelling member 31.

The wire propelling member 31 in the present embodiment is a rod-like member formed with a round hole having such a cross-section as to allow the passage of the single wire 16. The wire propelling member 31 is attached to the lower table 23 via a wire propelling member moving part 32 movable in three axial directions.

Here, if the wire propelling member 31 is configured to propel the plurality of wires 16, a rod-like member formed with a long hole having such a cross-section as to allow the passage of the plurality of wires 16 in a juxtaposed state is preferably used.

The wire propelling member moving part 32 in the present embodiment is configured by combining X-axis, Y-axis and Z-axis telescopic actuators 33 to 35. Each of the telescopic actuators 33 to 35 includes a ball screw 33b to 35b configured to be rotationally driven by a servo motor 33a to 35a, and a follower 33c to 35c configured to parallelly move by being threadably engaged with the ball screw 33b to 35b.

A housing 35d of the Z-axis telescopic actuator 35 is attached to the follower 33c of the X-axis telescopic actuator 33 so that the follower 35c is movable in the vertical direction. A housing 33d of the X-axis telescopic actuator 33 is attached to the follower 34c of the Y-axis telescopic actuator 34 so that the follower 33c is movable in the X-axis direction. A housing 34d of the Y-axis telescopic actuator 34 extends in the Y-axis direction and is attached to the lower table 23 so that the follower 34c is movable in the Y-axis direction.

The wire propelling member 31 extends in the X-axis direction and is attached to the follower 35c of the Z-axis telescopic actuator 35.

It should be noted that, although not shown, the wire propelling member 31 is provided with a clamping mechanism configured to clamp the wire 16 propelled from the wire propelling member 31.

The rotating part 25 configured to rotate the winding cores 36, 37 includes an electric motor 26 serving as a driving part. The winding core 36 is rotated by the rotating part 25 and obtains the track-shaped inner coil 13 (FIG. 10) by the wound wire 16. The winding core 37 rotates together with the winding core 36 and obtains the track-shaped outer coil 14 (FIG. 11) by the wound wire 16. The winding core 37 is configured to surround the winding core 36. The winding cores 36, 37 are also respectively referred to as an "inner winding core 36" and an "outer winding core 37" below.

Figure 2:
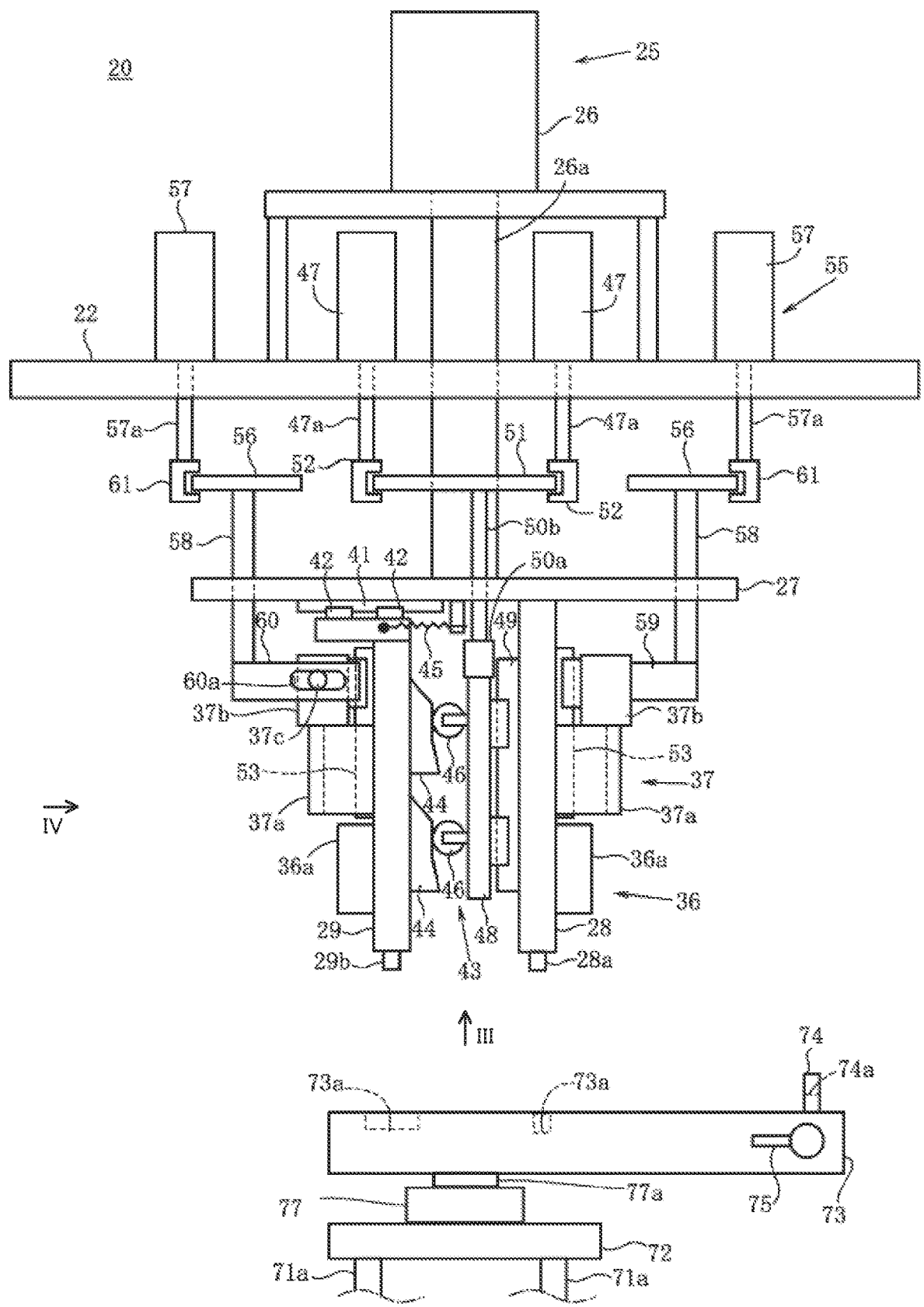
FIG. 2 is an enlarged view of a core winding unit of FIG. 1.

As shown in detail in FIG. 2, the rotating part 25 in the present embodiment includes a rotary plate 27 provided on a rotary shaft 26a of the electric motor 26 to rotate within a horizontal plane, and a pair of looping posts 28, 29 provided to stand on the rotary plate 27 across a center of rotation. Specifically, one looping post 28 is provided to stand on the rotary plate 27 to extend downward from a position deviated from the center of rotation, and the other looping post 29 provided to stand on the rotary plate 27 to extend downward and face the looping post 28 across the center of rotation.

The rotary plate 27 in the present embodiment is disc-shaped and a center thereof in a horizontal state is attached to the rotary shaft 26a of the electric motor 26. The looping post 29 is provided to stand on the rotary plate 27 movably on a virtual straight line passing though the center of rotation of the rotary plate 27. Specifically, the looping post 29 is provided to stand on the rotary plate 27 via a rail 41 and moving blocks 42. The rail 41 and the moving blocks 42 are described in detail later.

As described above, the looping post 28 is provided to stand at the position deviated from the center of rotation on the rotary plate 27. The rail 41 is attached on a virtual straight line passing through both the looping post 28 and the center of rotation, i.e. in a diameter direction passing through the looping post 28 on a side of the rotary plate 27 opposite to the looping post 28 across the center of rotation.

The moving blocks 42 are attached to an upper part of the looping post 29 and engaged with the rail 41 reciprocally movably in a longitudinal direction of the rail 41. That is, the looping post 29 is provided on the rail 41 movably via the moving blocks 42. In this way, the looping post 29 is provided to stand movably on a straight line passing through the center of rotation of the rotary plate 27.

Figure 3:
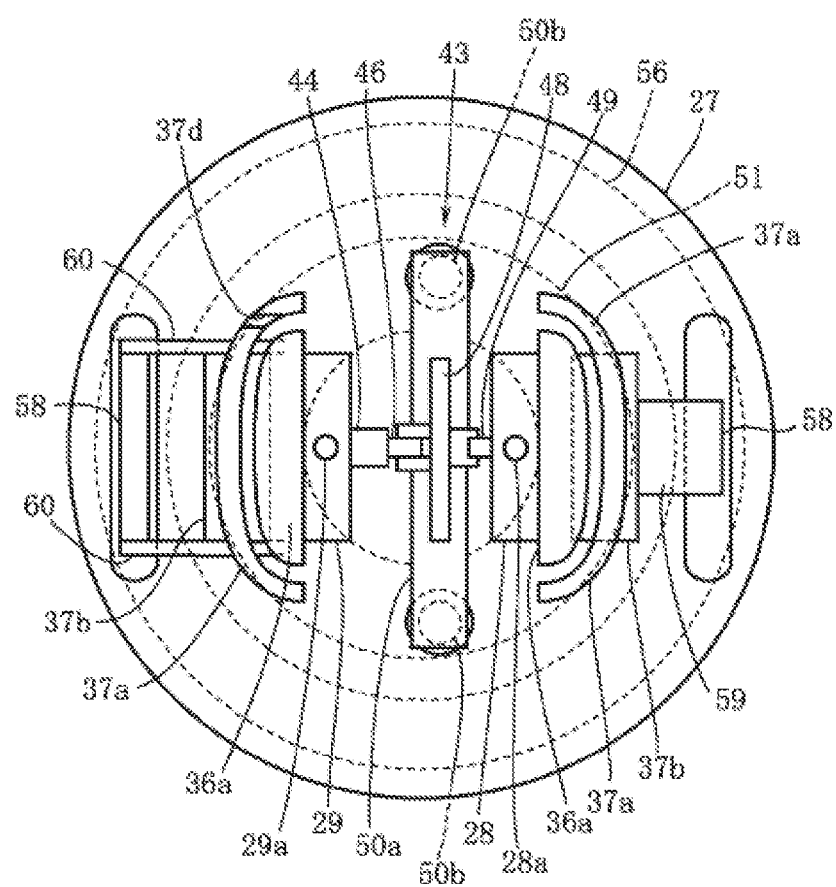
FIG. 3 is a view as seen in a direction of an arrow III in FIG. 2.

As shown in FIGS. 2 and 3, this winding device 20 includes a keeping part 43 configured to keep an interval between the looping posts 29 and 28 at a predetermined value. The keeping part 43 in the present embodiment includes a plate cam 44 provided on the looping post 29, a contact 46 provided vertically movably on the looping post 28, a coil spring 45 configured to bring the plate cam 44 into contact with the contact 46 by biasing the looping post 29 in a direction toward the looping post 28, and fluid pressure cylinders 47 serving as actuators provided on the upper table 22 and configured to vertically move the contact 46. The contact 46 is, for example, a roller.

The plate cam 44 is provided to extend in the vertical direction on a surface of the looping post 29 facing the looping post 28. The contact 46, which is configured to contact the plate cam 44, is rotatably supported on a movable table 48. A rail 49 is provided to extend in the vertical direction on a surface of the looping post 28 facing the plate cam 44, and the movable table 48 is vertically movably provided on this rail 49.

A horizontal member 50a is provided to extend in the diameter direction of the rotary plate 27 on the upper end of the movable table 48, and lower ends of vertical members 50b that movably penetrate through the rotary plate 27 are attached to both ends of the horizontal member 50a. A doughnut-shaped first disk 51 that surrounds the rotary shaft 26a is attached coaxially with the rotary shaft 26a to the upper ends of the vertical members 50b projecting upward of the rotary plate 27.

As shown in FIG. 2, the fluid pressure cylinders 47 serving as actuators are provided on the upper surface of the upper table 22 with retractable rods 47a thereof located below. An engaging member 52 to be engaged with the periphery of the first disk 51 is provided on the lower end of the retractable rod 47a. When the fluid pressure cylinders 47 cause the retractable rods 47a to extend or retract, the doughnut-shaped first disk 51 is lowered or raised via the engaging members 52 provided on the lower ends of the retractable rods 47a. At this time, the movable table 48 and the contact 46 are lowered or raised together with the first disk 51, and the looping post 29 moves in the diameter direction of the rotary plate 27 in accordance with an inclined surface of the plate cam 44 with which the contact 46 is in contact.

As just described, when the fluid pressure cylinders 47 cause the retractable rods 47a to extend or retract, the interval between the looping posts 28, 29 changes. When the extension or retraction of the retractable rods 47a is stopped, a movement of the looping post 29 stops and the interval between a pair of the looping posts 28, 29 is kept at a predetermined value.

Further, although the engaging member 52 is engaged with the periphery of the doughnut-shaped first disk 51 to prohibit independent upward and downward movements of the first disk 51, the engaging member 52 is configured to allow the rotation of the first disk 51 and allow the rotary plate 27 to rotate together with the first disk 51.

The inner winding core 36 includes inner winding pieces 36a respectively mounted on turning radius outer sides of tips of the pair of looping posts 28, 29. Specifically, the inner winding pieces 36a on which the wire 16 is to be looped are respectively mounted on the turning radius outer sides of the rotary plate 27 on lower parts of the looping posts 28, 29.

As shown in FIG. 3, an outer surface of the inner winding piece 36a on which the wire 16 is to be looped is formed to bulge out toward the turning radius outer side so that the looped wire 16 is gently folded to form a substantially arcuate shape.

Figure 10:
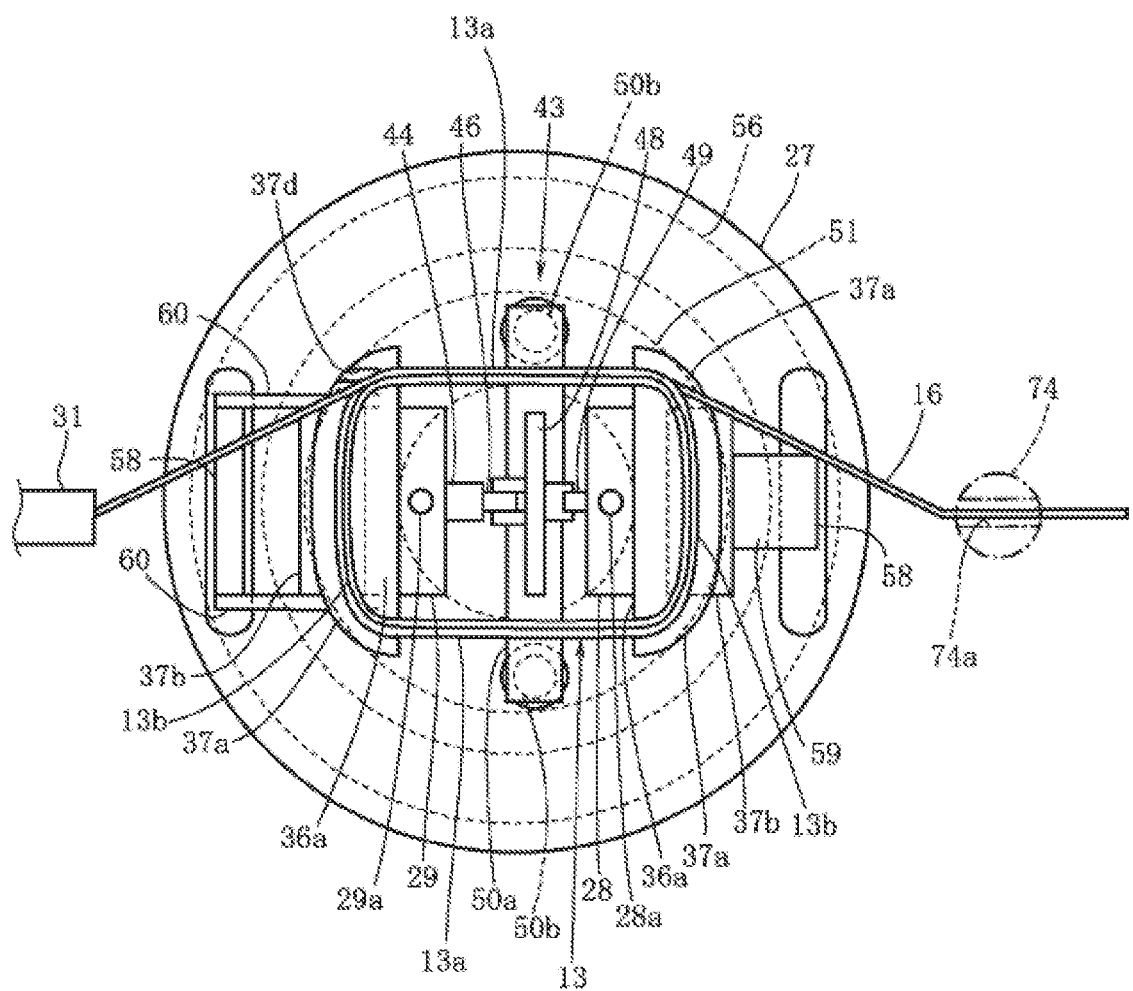
FIG. 10 is a view as seen in a direction of an arrow X in FIG. 8.

Thus, when the looping posts 28, 29 are rotated together with the inner winding core 36 to wind the wire 16 on the inner winding core 36, the wire 16 forms the track-shaped inner coil 13 as shown in FIG. 10. Specifically, parts of the wire 16 are looped on the inner winding pieces 36a on the looping posts 28, 29 to be arcuately curved, thereby forming the coil end parts 13b of the inner coil 13. The other parts of the wire 16 are stretched between the looping posts 28, 29 to form the coil side parts 13a of the inner coil 13.

On the other hand, the outer winding core 37 for obtaining the track-shaped outer coil 14 (FIGS. 11 and 12) includes outer winding pieces 37a configured to cover the inner winding pieces 36a with a predetermined clearance defined therebetween. As shown in FIG. 2, a case where the outer winding core 37 is movably provided on the pair of looping posts 28, 29 is shown in the present embodiment, and rails 53 extending in the vertical direction in parallel to an axis of rotation of the rotary plate 27 are respectively provided above the inner winding pieces 36a on the pair of looping posts 28, 29. The outer winding core 37 includes movable bodies 37b attached to the rails 53 movably upward and downward, and the outer winding pieces 37a are provided below the movable bodies 37b to project downward.

Figure 4:
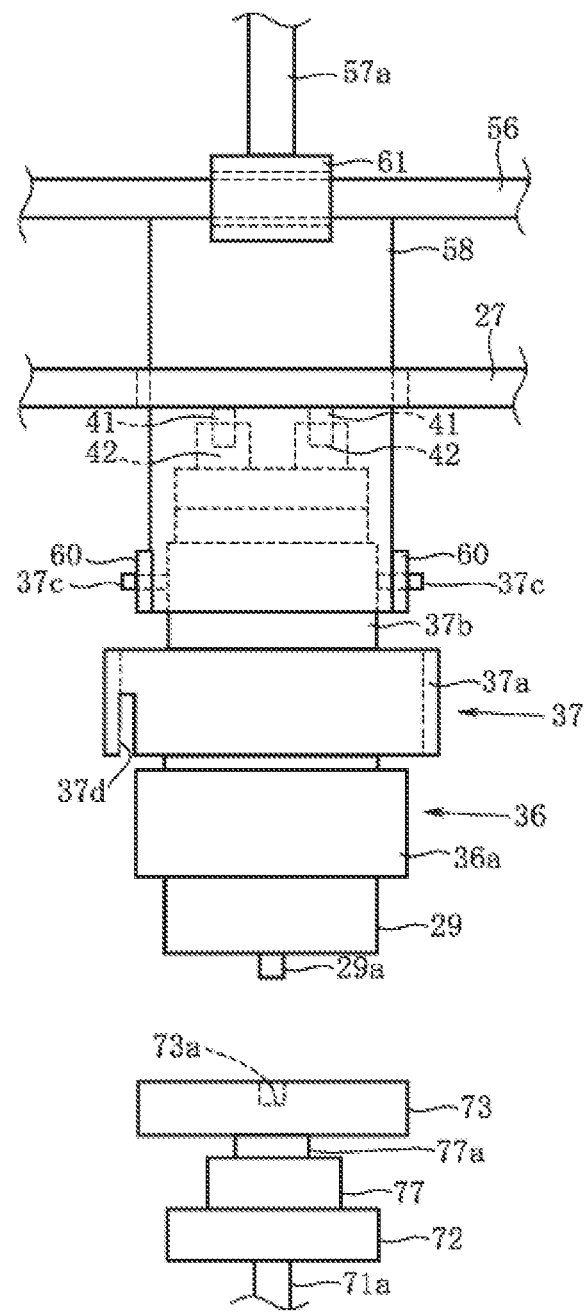
FIG. 4 is a view as seen in a direction of an arrow IV in FIG. 2.
Figure 5:
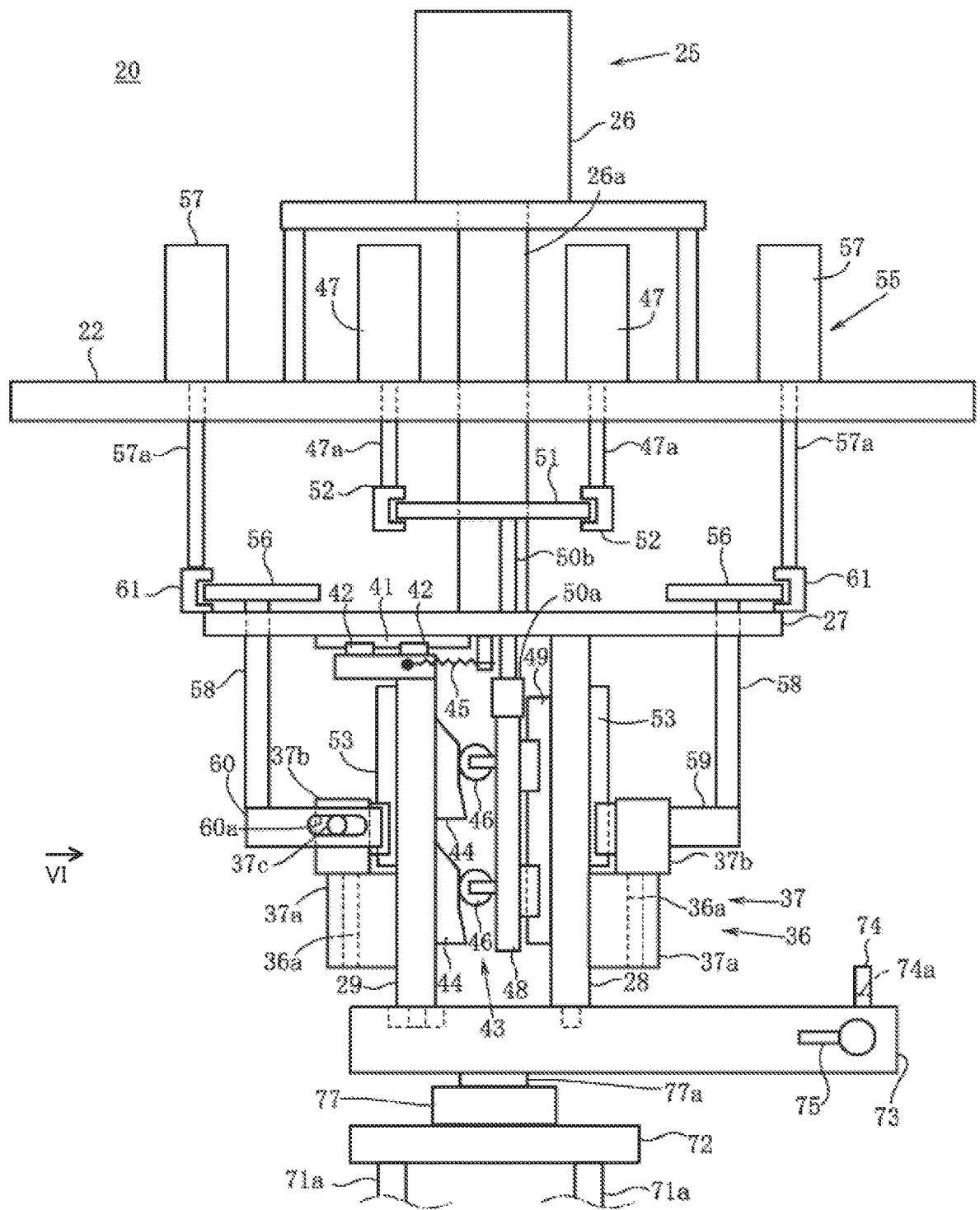
FIG. 5 is a view, corresponding to FIG. 2, showing a state where outer winding pieces of the winding device are surrounding inner winding pieces
Figure 6:
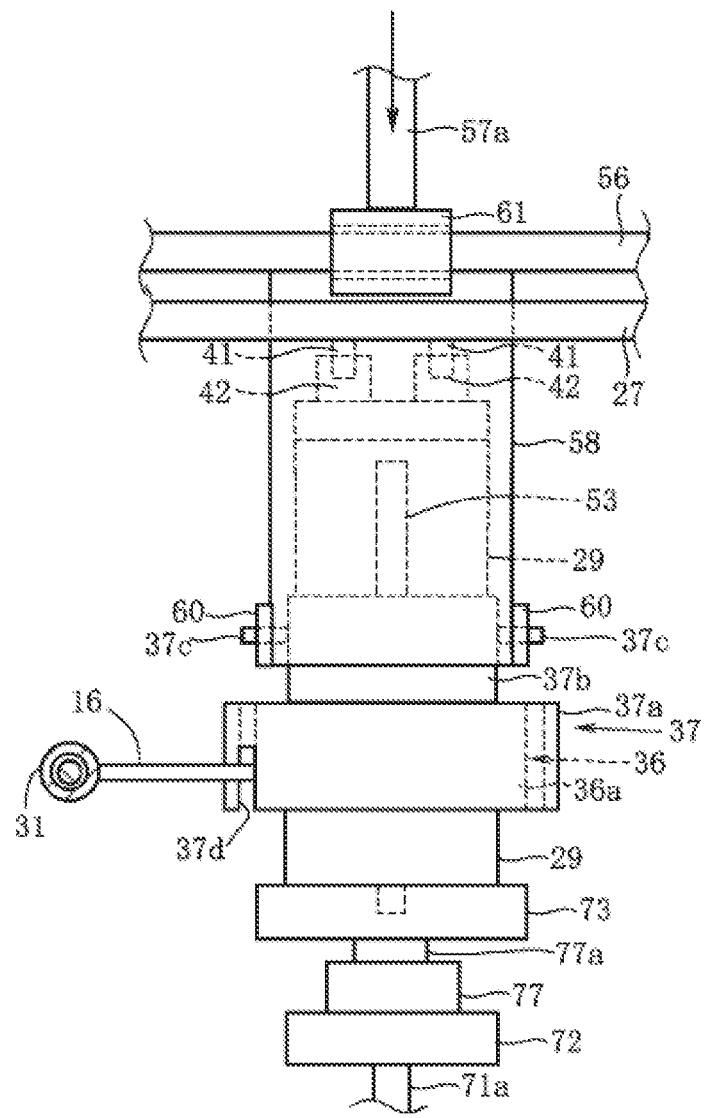
FIG. 6 is a view as seen in a direction of an arrow VI in FIG. 5.

The movable body 37b is raised and lowered together with the outer winding piece 37a. As shown in FIGS. 5 and 6, in a lowered state, the outer winding piece 37a is at a winding position for covering the inner winding piece 36a of the inner winding core 36 from the turning radius outer side with a predetermined distance defined therebetween. As shown in FIGS. 3 and 4, in a raised state, the outer winding piece 37a is at a standby position for releasing a turning radius outer side of the inner winding piece 36a. In this way, the outer winding piece 37a is configured to be reciprocally movable between the winding position and the standby position.

As shown in FIG. 2, the winding device 20 includes a winding core moving part 55 configured to reciprocate the outer winding core 37 between the winding position and the standby position. The winding core moving part 55 includes a doughnut-shaped second disk 56 located above the rotary plate 27 and coupled to the outer winding core 37, and fluid pressure cylinders 57 serving as actuators provided on the upper surface of the upper table 22 with retractable rods 57a located below.

A pair of lifting rods 58 extending in the vertical direction are provided to penetrate through the rotary plate 27 on turning radius outer sides of the outer winding core 37. The lower end of one lifting rod 58 is attached to one movable body 37b via a coupling horizontal rod 59.

As shown in FIGS. 2 to 4, a pair of sandwiching plates 60 that sandwich the other movable body 37b in a rotating direction of the rotary plate 27 are attached to the lower end of the other lifting rod 58. Each of the pair of sandwiching plates 60 is formed with a long hole 60a (FIG. 2) extending in a radial direction of the rotary plate 27, and the other movable body 37b is provided with round pins 37c insertable into the long holes 60a. The round pins 37c prohibit the outer winding core 37 including the other movable body 37b from moving upward and downward independently of the pair of sandwiching plates 60 in a state inserted in the long holes 60a while allowing this outer winding core 37 to move in the radial direction of the rotary plate 27 together with the looping post 29.

The doughnut-shaped second disk 56 coaxially surrounding the rotary shaft 26a and the doughnut-shaped first disk 51 is attached to the upper ends of the pair of lifting rods 58. An engaging member 61 to be engaged with the periphery of the second disk 56 is provided on the lower end of the retractable rod 57a of the fluid pressure cylinder 57.

When the fluid pressure cylinders 57 cause the retractable rods 57a to extend or retract, the second disk 56 is lowered or raised together with the outer winding core 37 via the engaging members 61 provided on the lower ends of the retractable rods 57a. As shown in FIG. 5, in a state where the second disk 56 is lowered, the outer winding core 37 is at the winding position. As shown in FIG. 2, in a state where the second disk 56 is raised, the outer winding core 37 is at the standby position. As just described, the fluid pressure cylinders 57 are configured to reciprocate the outer winding core 37 between the winding position and the standby position.

Further, although the engaging members 61 are engaged with the periphery of the doughnut-shaped second disk 56 to prohibit independent upward and downward movements of the second disk 56, the engaging member 61 are configured to allow the rotation of the second disk 56 and allow the rotary plate 27 to rotate together with the second disk 56.

Figure 9:
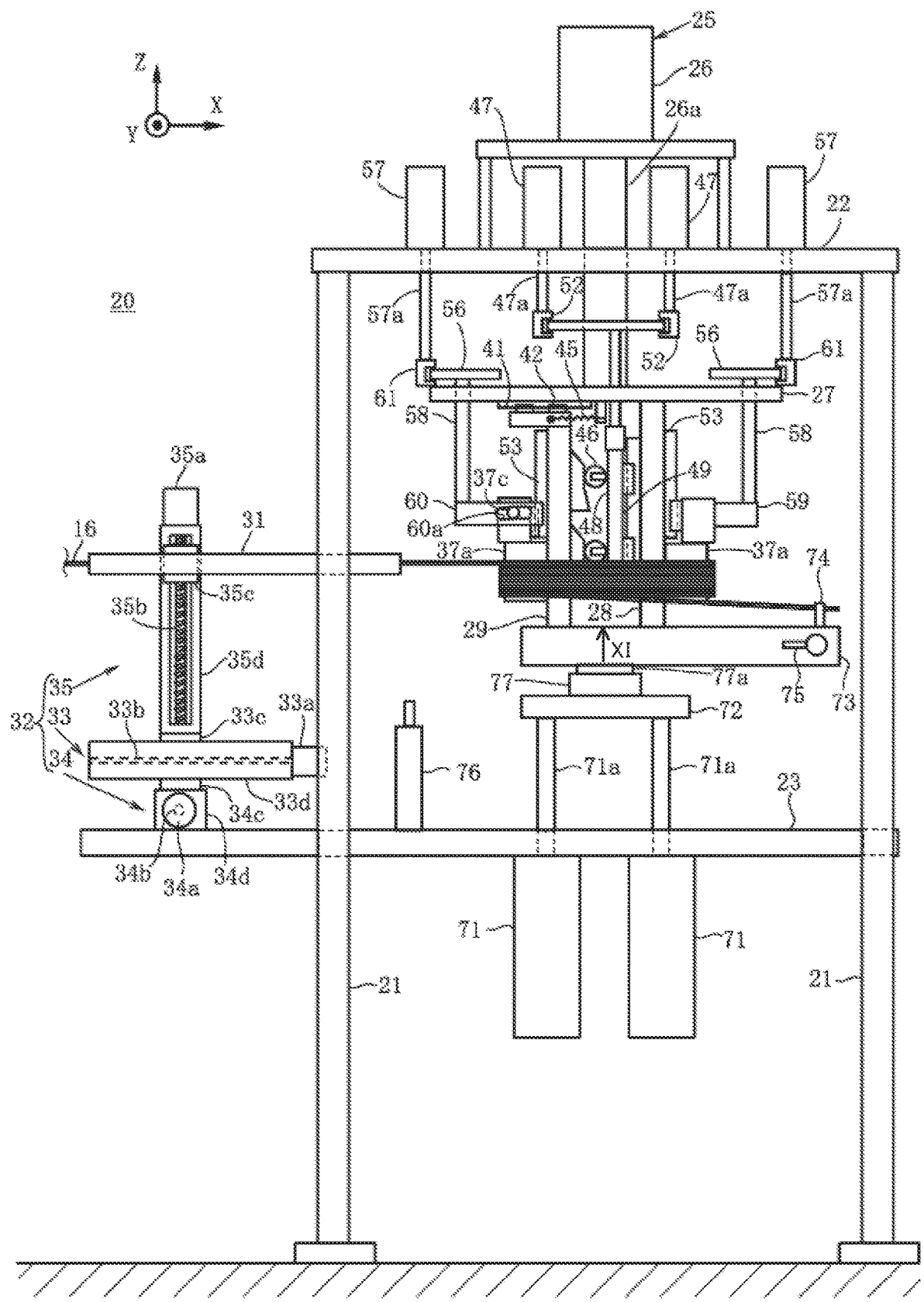
FIG. 9 is a view, corresponding to FIG. 1, showing a state where the wire is wound on an outer winding core to fabricate an outer coil.

Thus, as shown in FIG. 9, the outer winding pieces 37a at the winding position rotate together with the pair of looping posts 28, 29 provided to stand on the rotary plate 27 when the electric motor 26 of the rotating part 25 is driven to rotate the rotary plate 27. As a result, the wire 16 is wound on the outer winding pieces 37a covering the inner winding pieces 36a.

As shown in FIG. 3, an inner surface of the outer winding piece 37a is formed to be curved to cover the wire 16 looped on the inner winding piece 36a with a predetermined interval defined therebetween. Further, an outer surface of the outer winding piece 37a on which the wire 16 is to be looped is formed to bulge out toward the turning radius outer side so that the looped wire 16 is gently folded to form a substantially arcuate shape. As shown in FIG. 4, the outer winding piece 37a on the looping post 29 is formed with a cut 37d through which the wire 16 looped on the inner winding piece 36a is passed.

Figure 11:
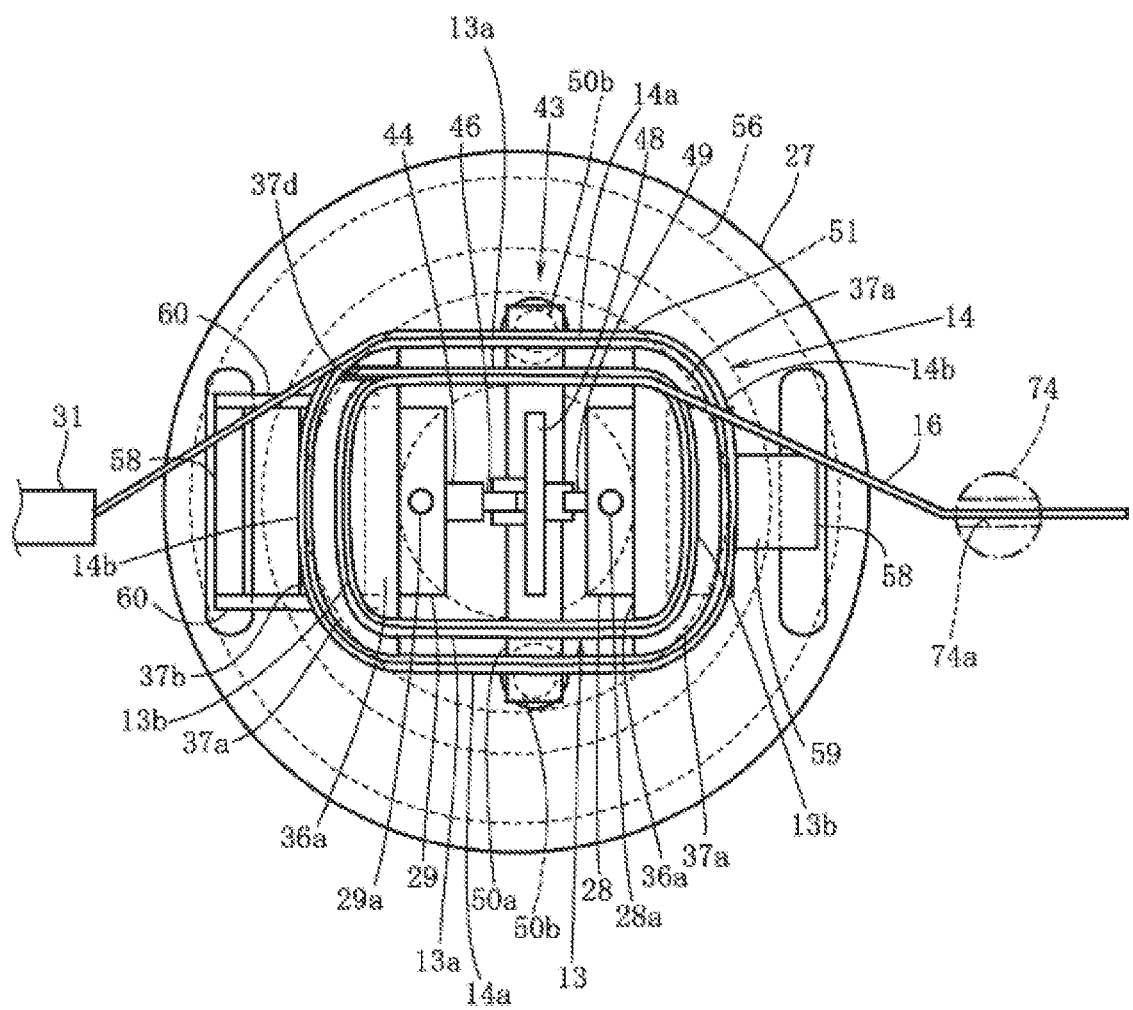
FIG. 11 is a view as seen in a direction of an arrow XI in FIG. 9.

Thus, when the wire 16 is wound on each outer winding piece 37a at the winding position, the wire 16 forms the track-shaped outer coil 14 as shown in FIG. 11. Specifically, parts of the wire 16 are looped on the outer winding pieces 37a to be arcuately curved, thereby forming the coil end parts 14b of the outer coil 14. The other parts of the wire 16 are stretched between the looping posts 28, 29 to form the coil side parts 14a of the outer coil 14.

As shown in FIG. 1, the lower table 23 is provided on the support posts 21 to sandwich the inner and outer winding cores 36, 37 between the upper table 22 and the lower table 23 from upper and lower sides, and this lower table 23 is provided with fluid pressure cylinders 71 with retractable shafts 71a facing upward. A base 72 is mounted on the upper ends of the retractable shafts 71a of the fluid pressure cylinders 71, and an electric motor 77 with a rotary shaft 77a facing upward is provided on this base 72.

The electric motor 77 is so provided on the base 72 that the rotary shaft 77a thereof is coaxial with the rotary shaft 26a of the electric motor 26 constituting the rotating part 25. A turn table 73 is attached to the rotary shaft 77a to turn within a horizontal plane. The turn table 73 is provided with a wire clip 74 configured to grip an end part of the wire 16 propelled from the wire propelling member 31.

The wire clip 74 is attached to the upper surface of the turn table 73 near an outer periphery. The wire clip 74 is formed with a slit 74a into which the wire 16 is insertable from above. The slit 74a is formed to be open in the upper end of the wire clip 74, and an unillustrated fastening member configured to fasten the wire 16 inserted into the slit 74a is built in the slit 74a.

The wire clip 74 is provided with an operation lever 75 configured to operate the fastening member. By the operation lever 75, the wire clip 74 is switched to either one of a fastened state for fastening the wire 16 having entered the slit 74a and a releasing state for releasing the wire 16 having entered the slit 74a without fastening the wire 16. The lower table 23 is provided with an actuator 76 configured to operate the operation lever 75.

The fluid pressure cylinders 71 function as a table moving part configured to raise and lower the turn table 73 along the Z-axis direction. The fluid pressure cylinders 71 serving as the table moving part are configured to raise and lower the turn table 73 between a proximate position and a separated position. As shown in FIG. 5, the proximate position is a position where the upper surface of the turn table 73 in a raised state is in contact with or proximate to the lower ends of the pair of looping posts 28, 29. As shown in FIG. 2, the separated position is a position where the turn table 73 in a lowered state is spaced apart from the lower ends of the pair of looping posts 28, 29.

Projections 28a, 29a are formed to project downward on the lower end surfaces of the pair of looping posts 28, 29. Holes 73a into which those projections 28a, 29a are insertable are formed in the upper surface of the turn table 73. Thus, if the turn table 73 is at the proximate position, these projections 28a, 29a are inserted in the holes 73a to prohibit the rotation of the turn table 73 separate from and independent of the pair of looping posts 28, 29. That is, the projections 28a, 29a are configured to rotate the turn table 73 according to the rotation of the rotary plate 27 if the turn table 73 is at the proximate position.

The electric motor 26 in the rotating part 25 rotates the inner and outer winding cores 36, 37, whereas the electric motor 77 on the lower table 23 rotates the turn table 73 provided with the wire clip 74 in synchronization with the inner and outer winding cores 36, 37. In this way, the wire 16 propelled from the wire propelling member 31 is taken up around the inner and outer winding cores 36, 37. The wire propelling member moving part 32 is configured to spirally wind the wire 16 propelled from the wire propelling member 31 on the inner and outer winding cores 36, 37 by moving the wire propelling member 31 in an axial direction of the rotary plate 27 according to the rotation of the inner and outer winding cores 36, 37.

Next, a winding method of the present invention is described.

The winding method of the present invention includes an inner winding step of fabricating the inner coil 13 by rotating the inner winding core 36 by the rotating part 25 to wind the wire 16 propelled from the wire propelling member 31 around the inner winding core 36, a surrounding step of surrounding the inner winding core 36 together with the inner coil 13 by the outer winding core 37, and an outer winding step of fabricating the outer coil 14 by rotating the outer winding core 37 together with the inner winding core 36 to wind the wire 16 propelled from the wire propelling member 31 around the outer winding core 37.

In the present embodiment, the above winding device 20 is used and an operation in the winding device 20 is automatically controlled by an unillustrated controller.

Each step is described in detail below.

<Inner Winding Step>

In the inner winding step, the inner coil 13 is fabricated by rotating the inner winding core 36 by the rotating part 25 to wind the wire 16 propelled from the wire propelling member 31 around the inner winding core 36. Thus, the wire 16 is first propelled from the wire propelling member 31.

Specifically, the wire 16 wound and stored on the spool is prepared, the wire 16 is pulled out from the spool, and the wire 16 straightened by the unillustrated stretcher is inserted through the wire propelling member 31 and clamped by the unillustrated clamping mechanism.

Figure 7:
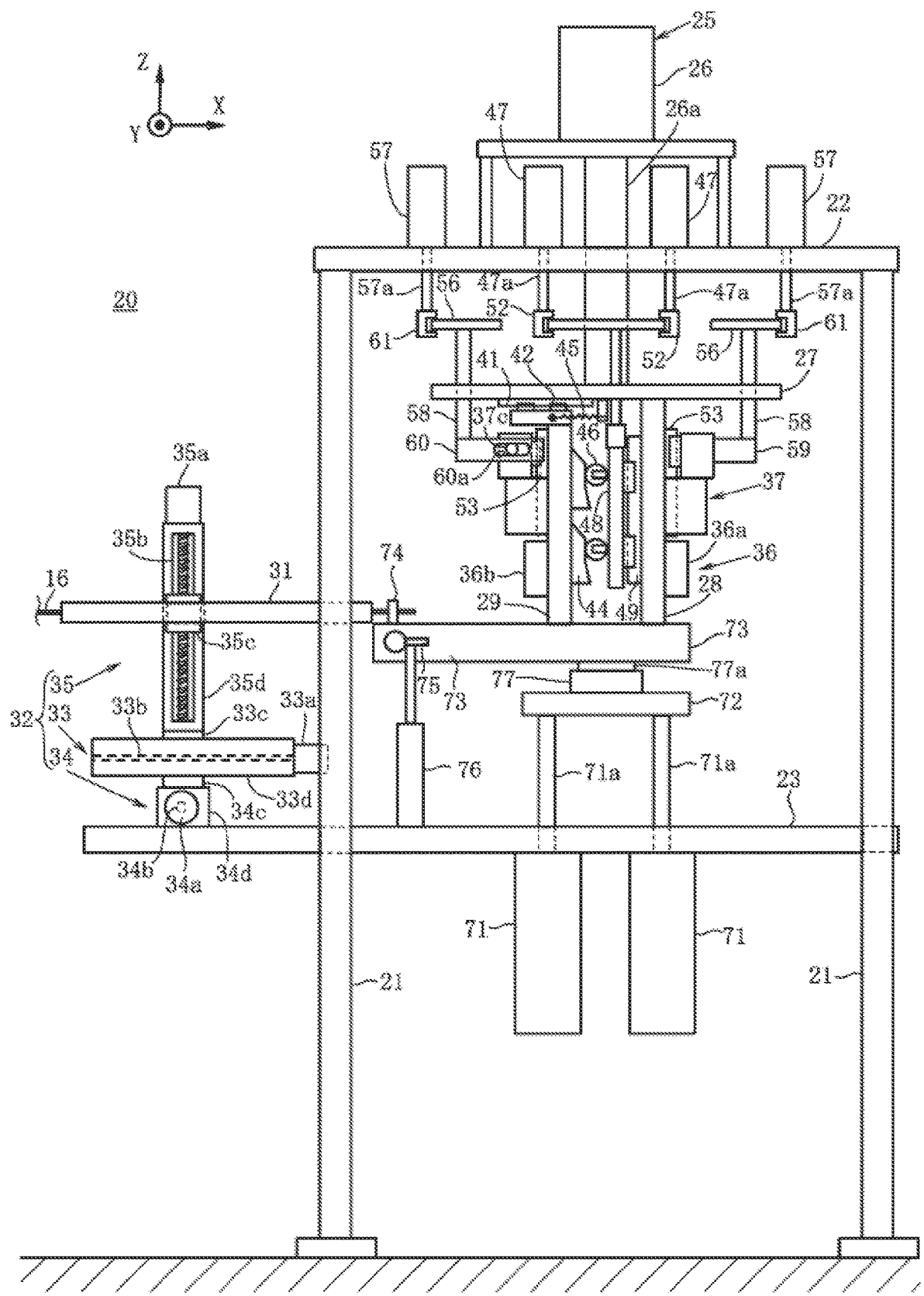
FIG. 7 is a view, corresponding to FIG. 1, showing a winding start state where an end part of a wire is gripped by a wire clip.

As shown in FIG. 7, the electric motor 77, which is provided on the lower table 23, rotates the turn table 73 and causes the wire clip 74 attached near the outer periphery of the turn table 73 to face the wire propelling member 31. Then, the wire propelling member 31 is moved by the wire propelling member moving part 32, and the end part of the wire 16 projecting from the wire propelling member 31 is inserted into the slit 74a (FIG. 10) in the wire clip 74 and fastened by the unillustrated fastening member built in the slit 74a.

Further, the fluid pressure cylinders 71 raise the turn table 73 to insert the projections 28a, 29a formed on the lower end surfaces of the pair of looping posts 28, 29 into the holes 73a formed in the upper surface of the turn table 73, thereby prohibiting the rotation of the turn table 73 separate from and independent of the pair of looping posts 28, 29.

The fluid pressure cylinders 47 serving as actuators in the keeping part 43 cause the retractable rods 47a to extend or retract, thereby changing the interval between the pair of looping posts 28, 29. In a state where a desired interval is obtained, the fluid pressure cylinders 47 stop the extension or retraction of the retractable rods 47a to keep the interval between the pair of looping posts 28, 29 at a predetermined value.

The fluid pressure cylinders 57 in the winding core moving part 55 cause the retractable rods 57a to retract, thereby raising the outer winding core 37 and maintaining the outer winding core 37 at the standby position for releasing the turning radius outer sides of the inner winding pieces 36a.

Thereafter, the clamping of the wire 16 by the clamping mechanism of the wire propelling member 31 is canceled and the electric motor 26 in the rotating part 25 is driven to rotate the inner winding core 36 together with the rotary plate 27 a predetermined number of times. Along with that, the electric motor 77 provided on the lower table 23 is driven to also synchronously rotate the turn table 73 provided with the wire clip 74 for fastening the end part of the wire 16 in the same direction and at the same speed a predetermined number of times.

Figure 8:
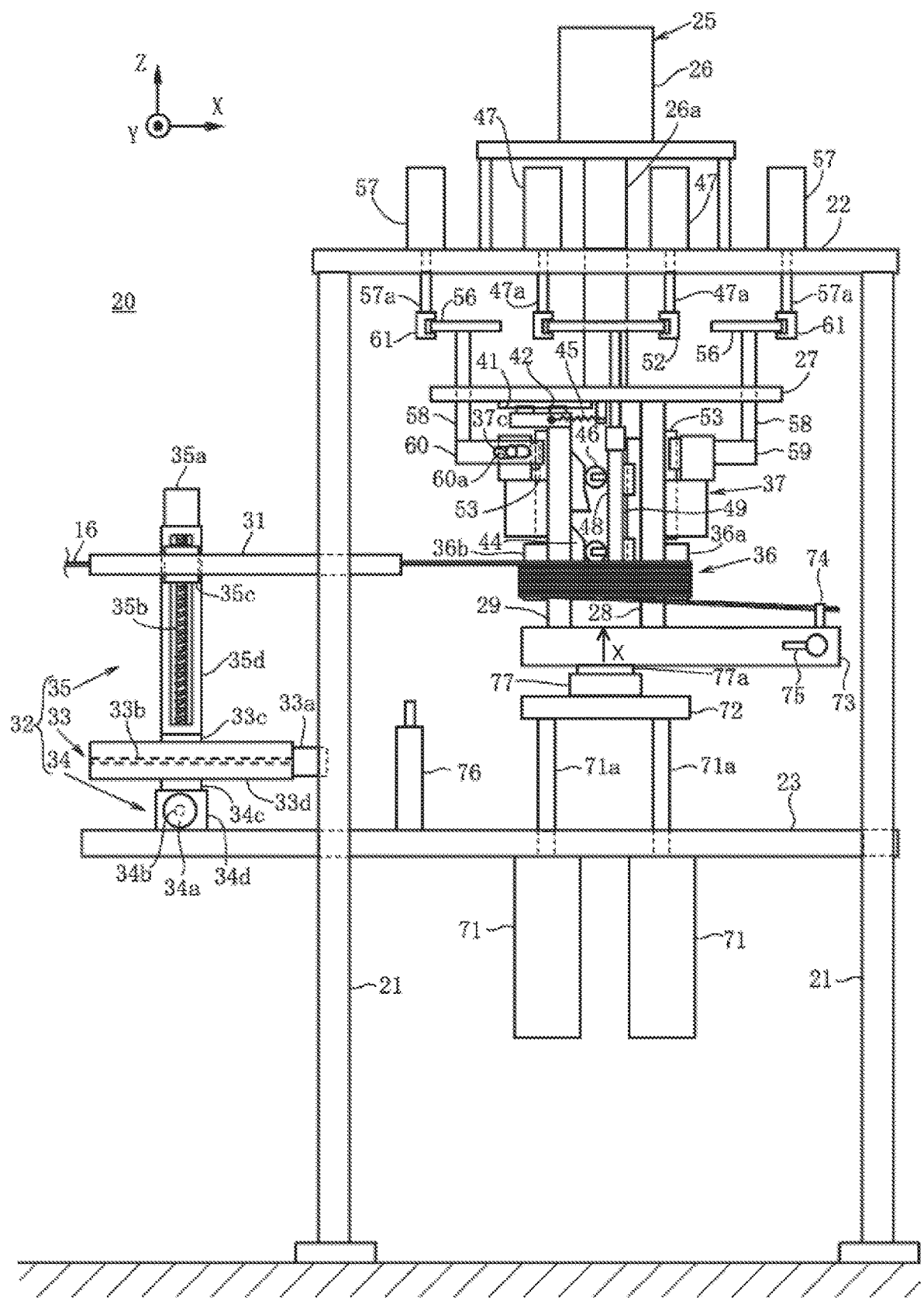
FIG. 8 is a view, corresponding to FIG. 1, showing a state where the wire is wound on an inner winding core to fabricate an inner coil.

As shown in FIG. 8, the wire 16 propelled from the wire propelling member 31 is taken up around the inner winding core 36 a predetermined number of times in this way. The wire propelling member moving part 32 moves the wire propelling member 31 in the axial direction of the rotary plate 27 according to the rotation of the inner winding core 36, thereby spirally winding the wire 16 propelled from the wire propelling member 31 on the inner winding core 36.

In this way, as shown in FIG. 10, the track-shaped inner coil 13 is fabricated in the inner winding step so as to include the coil end parts 13b formed of the parts of the wire 16 looped on the inner winding pieces 36a and the coil side parts 13a formed of parts of the wire 16 stretched between the pair of looping posts 28, 29.

<Surrounding Step>

In the surrounding step, the inner winding core 36 is surrounded together with the inner coil 13 by the outer winding core 37. In the present embodiment using the winding device 20 configured such that the outer winding core 37 is movable, the retractable rods 57a of the fluid pressure cylinders 57 in the winding core moving part 55 are caused to project, thereby moving the outer winding core 37 downward from the standby position shown in FIG. 2 to the surrounding position for surrounding the inner coil 13 as shown in FIG. 5. Then, the coil end parts 13b of the inner coil 13 are covered by the outer winding pieces 37a.

At this time, as shown in FIG. 6, the position of the wire propelling member 31 is adjusted by the wire propelling member moving part 32 such that the wire 16 extending from the inner coil 13 to the wire propelling member 31 enters the cut 27d formed in the outer winding piece 37a on the looping post 29. In this way, the wire 16 is guided from the inner coil 13 to the outer surface of the outer winding piece 37a.

<Outer Winding Step>

In the outer winding step, the wire 16 that is propelled from the wire propelling member 31 is wound around the outer winding core 37 by rotating the outer winding core 37 together with the inner winding core 36, whereby the outer coil 14 is fabricated.

Specifically, as shown in FIG. 9, the electric motor 26 in the rotating part 25 is driven again to further rotate the outer winding core 37 together with the rotary plate 27 a predetermined number of times. Along with that, the electric motor 77 provided on the lower table 23 is driven to also synchronously rotate the turn table 73 provided with the wire clip 74 for fastening the end part of the wire 16 in the same direction and at the same speed a predetermined number of times. In this way, the wire 16 that is propelled from the wire propelling member 31 is taken up around the outer winding pieces 37a in the outer winding core 37 a predetermined number of times.

The wire propelling member moving part 32 moves the wire propelling member 31 in the axial direction of the rotary plate 27 according to the rotation of the outer winding core 37, thereby spirally winding the wire 16 propelled from the wire propelling member 31 on the outer winding core 37.

In this way, as shown in FIG. 11, the track-shaped outer coil 14 is fabricated in the outer winding step so as to include the coil end parts 14b formed of the parts of the wire 16 looped on the outer winding pieces 37a and the coil side parts 14a formed of parts of the wire 16 stretched between the pair of looping posts 28, 29.

Here, since the outer winding pieces 37a in the outer winding core 37 are configured to cover the coil end parts 13b of the inner coil 13 from outside, the outer coil 14 that is formed of the wire 16 looped on the outer winding pieces 37a is formed to surround the inner coil 13 from outside with a predetermined clearance defined therebetween. Thus, the inner coil 13 and the outer coil 14 differ in size. Thus, in the winding device 20 and the winding method of the present invention, two track-shaped inner and outer coils 13, 14 in which the parts of the wire 16 forming the coil end parts 13b, 14b are different in length can be continuously fabricated.

It should be noted that, after the inner and outer coils 13, 14 are fabricated, these coils are separated from the inner and outer winding cores 36, 37 and conveyed. In a post-process, those coil side parts 13a, 14a are inserted into the slots 11b of the core 11 (FIGS. 13 and 14) using a conventionally used inserter method.

Since the outer coil 14 in the present invention is formed to surround the inner coil 13 from outside with a predetermined clearance defined therebetween, if those coils are aligned and wound, the coil side parts 13a, 14a in an aligned state can be inserted into the slots 11b of the core 11 (FIGS. 13 and 14) by transferring the coil 12 as it is.

Further, the lengths L1, L2 between the coil side parts 13a, 14a of the inner and outer coils 13, 14 obtained in the present invention are different. Thus, even if those coil side parts 13a, 14a are inserted into different slots 11b as shown in FIG. 12, the coil end parts 13b of the inner coil 13 do not project from the end surfaces of the core 11 beyond the coil end parts 14b of the outer coil 14. Therefore, it is possible to avoid such a situation where the coil end parts 13b of the inner coil 13 and the coil end parts 14b of the outer coil 14 overlap and the coil end parts 13b, 14b are difficult to form. As a result, higher efficiency, miniaturization and the like of an obtained generator or motor can be achieved.

Further, since the inner and outer coils 13, 14 are continuously fabricated, a process that is required in the case of separately fabricating the inner and outer coils 13, 14, i.e. a process of electrically connecting the inner and outer coils 13, 14 is not necessary and it is also possible to avoid a situation where manufacturing processes increase.

Here, the procedure of separating the inner and outer coils 13, 14 from the inner and outer winding cores 36, 37 is described. First, the wire 16 is clamped by the unillustrated clamping mechanism in the wire propelling member 31 to prohibit the wire 16 from being newly propelled from the wire propelling member 31.

The inner and outer coils 13, 14 that are formed on the inner and outer winding cores 36, 37 are gripped by an unillustrated shape maintaining tool, and the wire 16 extending from the wire propelling member 31 to the outer coil 14 is cut by a cutting device or the like with the shapes of the inner and outer coils 13, 14 maintained. In this way, the inner and outer coils 13, 14 are separated from the wire propelling member 31.

The turn table 73 is lowered using the fluid pressure cylinders 71 to release a space below the lower end surfaces of the pair of looping posts 28, 29. Then, the inner and outer coils 13, 14 whose shapes are maintained by the unillustrated shape maintaining tool are moved downward together with the shape maintaining tool and withdrawn from the released lower end surfaces of the pair of looping posts 28, 29.

In this way, the inner and outer coils 13, 14 are separated from the inner and outer winding cores 36, 37. At that time, the retractable rods 47a of the fluid pressure cylinders 47 serving as the actuators in the keeping part 43 are caused to extend, thereby reducing the interval between the looping posts 28 and 29 and reducing the intervals between the inner winding pieces 36a and the outer winding pieces 37a provided on the looping posts 28, 29. In this way, the inner and outer coils 13, 14 that are formed of the wire 16 looped on the inner and outer winding pieces 36a, 37a are loosened and the inner and outer coils 13, 14 can be easily separated from the inner and outer winding cores 36, 37.

Further, after the inner and outer coils 13, 14 are separated from the inner and outer winding cores 36, 37, the inner winding step described above can be resumed. In this way, productivity can be improved.

It should be noted that although a case where the wire propelling member 31 allows the passage of the single wire 16 has been described in the above embodiment, this wire propelling member 31 may allow the passage of a plurality of wires 16 in a closely juxtaposed state.

Further, although a case where the cut 37d, through which the wire 16 looped on the inner winding pieces 36a is passed, is formed in the outer winding piece 37a on the looping post 29 has been described in the above embodiment, a cut 37d, through which the wire 16 looped on the inner winding pieces 36a is passed, may be formed in the outer winding piece 37a on the looping post 28. If the wire 16 looped on the inner winding pieces 36a can be guided to the outer surface of the outer winding piece 37a, such a cut 37d needs not be formed.

Furthermore, although a case where the table moving part configured to raise and lower the turn table 73 in the Z-axis direction is the fluid pressure cylinders 71 has been described in the above embodiment, the table moving part is not limited to the fluid pressure cylinders as long as the turn table 73 is movable between the proximate position and the separated position, and the turn table 73 may be moved, for example, by a servo motor.

The embodiment of the present invention is summarized below.

The present embodiment relates to a winding device for taking up a wire on a winding core rotated by a rotating part.

In this winding device, the winding core includes an inner winding core configured to be rotated by the rotating part and an outer winding core configured to surround the inner winding core and rotate together with the inner winding core.

If the rotating part includes a rotary plate configured to be rotated by a driving part and a pair of looping posts provided to stand across a center of rotation on the rotary plate, the inner winding core preferably includes inner winding pieces respectively mounted on turning radius outer sides of tips of the pair of looping posts and the outer winding core preferably includes outer winding pieces respectively provided on the pair of looping posts to cover the inner winding pieces with a predetermined clearance defined therebetween.

In this case, the outer winding pieces can be respectively movably provided on the pair of looping posts, a winding core moving part can be provided which reciprocate each outer winding piece between a winding position for covering the inner winding piece and a standby position deviated from the inner winding piece in a rotation axis direction of the rotary plate, either one or both of the pair of looping posts can stand movably on a straight line passing through the center of rotation of the rotary plate, and a keeping part can be provided which keeps an interval between the pair of looping posts at a predetermined value.

Further, the winding device can include a turn table provided coaxially with the rotary plate and rotatably with the rotary plate and provided with a wire clip configured to grip an end part of the wire, and a table moving part configured to move the turn table. The table moving part moves the turn table between a proximate position where the turn table is in contact with or proximate to end parts of the pair of looping posts and a separated position where the turn table is separated from the end parts of the pair of looping posts.

Another embodiment relates to a winding method. The winding method includes an inner winding step of fabricating an inner coil by rotating an inner winding core by a rotating part to wind a wire propelled from a wire propelling member around the inner winding core, a surrounding step of surrounding the inner winding core together with the inner coil by an outer winding core, and an outer winding step of fabricating an outer coil by rotating the outer winding core together with the inner winding core to wind the wire propelled from the wire propelling member around the outer winding core.

In this winding method, the outer winding core is preferably located at a standby position deviated from the inner winding core in a rotation axis direction in the inner winding step, and moved from the standby position to a surrounding position for surrounding the inner coil in the surrounding step.

Further, in the case of using a rotating part including a pair of looping posts separated across a center of rotation, an inner winding core including inner winding pieces respectively mounted on turning radius outer sides of tips of the pair of looping posts and an outer winding core including outer winding pieces respectively provided on the pair of looping posts to cover the inner winding pieces with a predetermined clearance defined therebetween, it is further preferable that a track-shaped inner coil including coil end parts formed of parts of the wire looped on the inner winding pieces and coil side parts formed of parts of the wires stretched between the pair of looping posts is fabricated in the inner winding step, the outer winding pieces are provided to cover the coil end parts of the inner coil in the surrounding step, and a track-shaped outer coil including coil end parts formed of parts of the wire looped on the outer winding pieces and coil side parts formed of parts of the wires stretched between the pair of looping posts is fabricated in the outer winding step.

In the winding device of the present embodiment, the winding core includes the inner winding core and the outer winding core. Further, the winding method includes the inner winding step of fabricating the inner coil by winding the wire on the inner winding core and the outer winding step of fabricating the outer coil by winding the wire around the outer winding core. Thus, a plurality of coils in which parts of a wire forming coil end parts are different in length can be continuously fabricated.

If the inner winding core includes the inner winding pieces respectively mounted on the turning radius outer sides of the tips of the pair of looping posts and the outer winding core includes the outer winding pieces configured to cover the inner winding pieces with a predetermined clearance defined therebetween, the track-shaped inner and outer coils can be easily obtained.

In this case, the surrounding step in the winding method is facilitated by respectively providing the outer winding pieces movably on the pair of looping posts and reciprocating the outer winding pieces between the winding position and the standby position. Further, by providing either one or both of the pair of looping posts to stand movably on a straight line passing through the center of rotation of the rotary plate, the lengths of the coil side parts in the obtained track-shaped inner and outer coils can be easily changed.

The embodiments of the present invention described above are merely illustration of some application examples of the present invention and not of the nature to limit the technical scope of the present invention to the specific constructions of the above embodiments.

The present application claims a priority based on Japanese Patent Application No. 2016-202226 filed with the Japan Patent Office on Oct. 14, 2016, all the contents of which are hereby incorporated by reference.

The invention claimed is:

1. A winding device comprising a winding core configured to take up a wire and a rotating part configured to rotate the winding core, wherein
the winding core includes an inner winding core configured to be rotated by the rotating part and an outer winding core configured to surround the inner winding core and rotate together with the inner winding core;
the rotating part includes a rotary plate configured to be rotated by a driving part and a pair of looping posts provided to stand across a center of rotation on the rotary plate;
the inner winding core includes inner winding pieces respectively mounted on turning radius outer sides of tips of the pair of looping posts; and
the outer winding core includes outer winding pieces respectively provided on the pair of looping posts to cover the inner winding pieces with a predetermined clearance.

2. The winding device according to claim 1, wherein:
the outer winding pieces are respectively movably provided on the pair of looping posts; and
the winding device further comprises a winding core moving part configured to reciprocate each of the outer winding pieces between a winding position to cover the inner winding piece and a standby position deviated from the inner winding piece in a rotation axis direction of the rotary plate.

3. The winding device according to claim 1, wherein:
either one or both of the pair of looping posts is movably provided to stand on a straight line passing through the center of rotation of the rotary plate; and
the winding device further comprises a keeping part configured to keep an interval between the pair of looping posts at a predetermined value.

4. The winding device according to claim 1, wherein:
a turn table provided coaxially with the rotary plate and rotatably with the rotary plate, the turn table being provided with a wire clip configured to grip an end part of the wire; and
a table moving part configured to move the turn table between a proximate position where the turn table is in contact with or proximate to end parts of the pair of looping posts and a separated position where the turn table is separated from the end parts of the pair of looping posts.

5. A winding method, comprising:
an inner winding step of fabricating an inner coil by rotating an inner winding core by a rotating part to wind a wire propelled from a wire propelling member around the inner winding core;
a surrounding step of surrounding the inner winding core together with the inner coil by an outer winding core; and
an outer winding step of fabricating an outer coil by rotating the outer winding core together with the inner winding core to wind the wire propelled from the wire propelling member around the outer winding core, wherein:
the rotating part includes a pair of looping posts separated across a center of rotation, the inner winding core includes inner winding pieces respectively mounted on turning radius outer sides of tips of the pair of looping posts, and the outer winding core includes outer winding pieces respectively provided on the pair of looping posts to cover the inner winding pieces with a predetermined clearance;

the inner winding step includes fabricating the track-shaped inner coil including coil end parts formed of parts of the wire looped on the inner winding pieces and coil side parts formed of parts of the wires stretched between the pair of looping posts;

the surrounding step includes providing the outer winding pieces to cover the coil end parts of the inner coil; and the outer winding step includes fabricating the track-shaped outer coil including coil end parts formed of parts of the wire looped on the outer winding pieces and coil side parts formed of parts of the wires stretched between the pair of looping posts.

6. The winding method according to claim 5, wherein:

the inner winding step includes locating the outer winding core at a standby position to deviate from the inner winding core in a rotation axis direction, and the surrounding step includes moving the outer winding core from the standby position to a surrounding position to surround the inner coil.

\* \* \* \* \*